United States Patent [19]
Searle

[11] Patent Number: 5,486,262
[45] Date of Patent: Jan. 23, 1996

[54] FRICTION WELDING

[75] Inventor: John G. Searle, Cannock, England

[73] Assignee: Rolls-Royce plc, London, England

[21] Appl. No.: 242,458

[22] Filed: May 13, 1994

[30]       Foreign Application Priority Data

May 13, 1993 [GB] United Kingdom ............... 9309819

[51] Int. Cl.⁶ ........................................ B23K 20/12
[52] U.S. Cl. .................... 156/580; 156/73.5; 228/2.1; 228/44.3; 228/112.1
[58] Field of Search ....................... 228/2.1, 112.1, 228/44.3; 156/73.5, 580.2, 580; 269/57

[56]             References Cited

U.S. PATENT DOCUMENTS

| | | | |
|---|---|---|---|
| 3,896,986 | 7/1975 | Edwards | 228/2.1 |
| 4,033,501 | 7/1977 | Ambrose, Jr. et al. | 228/2.1 |
| 4,239,575 | 12/1980 | Leatherman | 156/272 |
| 5,137,166 | 8/1992 | Unger et al. | 156/73.5 |
| 5,148,957 | 9/1992 | Searle | 228/2.1 |
| 5,188,275 | 2/1993 | Daines | 228/2.1 |
| 5,248,077 | 9/1993 | Rhoades et al. | 228/112.1 |

FOREIGN PATENT DOCUMENTS 1496030  12/1977  United Kingdom.

Primary Examiner—David A. Simmons
Assistant Examiner—J. Sells
Attorney, Agent, or Firm—Oliff & Berridge

[57]             ABSTRACT

A component holder for a friction welding apparatus has upper and lower clamp members which can be urged towards each other in order to clamp between them a component to which second or further components are to be friction welded. The first component is held in the component holder substantially entirely by friction clamping forces. The component holder is particularly suited to use with friction welding apparatus in which the component holder is carried by an angularly reciprocable workpiece mounting member.

11 Claims, 3 Drawing Sheets

1

FRICTION WELDING

BACKGROUND OF THE INVENTION

This invention relates to improvements relating to friction welding. In particular the invention concerns a component holder, or tooling, for holding components to be welded, especially, but not necessarily exclusively, discs or drums to which blades are to be frictionally welded to make blisks or blums for a gas turbine engine.

It is known that two components, even metal components can be welded together by reciprocating at least one of the components and urging the components together, the frictional heat generated between the components melting the material of at least one component, and more usually both components, so as to form a friction weld. A technique and apparatus for frictional welding of this kind is described in co-pending patent applications GB 9309824.2 and GB 9309865.5. One example of a technical field in which friction welding is currently seen as having useful applications is in the field of fabricating blisks and blums for compressors or turbines for aircraft engines. Compressor assemblies may comprise a blisk (blade plus integral disc), or a blum (blade plus integral drum) which is effectively several blisks joined together.

SUMMARY OF THE INVENTION

According to the invention in its broadest form there is provided a component holder for holding a component during friction welding comprising a first clamp member and a second clamp member separable from the first clamp member so as to receive in use between the clamp members a component to be welded. Preferably the clamp members are entirely separable and clamp force means is provided to urge the two clamp members towards each other and into clamping engagement with the component.

The clamp members are preferably arranged to clamp the component around a ring region of the component, preferably in substantially continuous contact with the component at the ring region. They may have an annular clamping ring or pressure plate. The clamp members are rigid and at least one, and preferably both, clamp members may have a plate or dish clamping deck.

The clamping force exerted in use by the clamp members is preferably so great that weld pressure and weld reciprocatory friction forces on the component held are relatively small in comparison. The component is preferably held fixed relative to the clamp members substantially entirely by friction.

The clamp members may comprise an upper and a lower clamp member. The clamp members may be of a disc, drum or shell-like structure. The component may be received inside them, or one of them. The component holder preferably comprising a rigid shell clamping the component at the periphery of the shell.

The clamp members may be mounted on a workpiece mounting member via a separable, or indexable coupling.

The lower clamp member may have a ring of locating formations provided which engage a complementary ring of complementary locating formations on the workpiece holding member. The formations and complementary formations are preferably equi-angularly spaced. The lower clamp member may be movable away from the workpiece holding member so as to index the clamp members and associated workpiece between allowable index positions, and movable back towards the workpiece holding member so as to allow welding.

Effectively, the two clamp members may form a cassette which contains the workpiece or first mentioned component to which a second or further component is to be friction welded. The cassette including the workpiece is effectively a single unit. The cassette has a known external shape and configuration and can be manipulated by the friction welding apparatus more easily than the workpiece alone. The entire cassette is preferably indexed between discrete positions to allow different components to be welded to the workpiece at different places on the workpiece.

Friction welding apparatus embodying the invention comprises a body having a mounting region adapted to mount a workpiece for friction welding, and workpiece clamping means comprising clamping force generating means provided at a region of the body disposed away from the mounting region and an elongate clamping force-transmitting member adapted to transfer a clamping force which clamps the workpiece to the mounting region from the clamping force generating means to the mounting region.

According to a further aspect of the invention there is provided workpiece mounting means for friction welding apparatus comprising means defining a chamber or recesses adapted to receive in use a workpiece to which a component is to be welded. Thus the workpiece extends in use into the chamber.

According to another aspect of the invention a method of holding a workpiece to be friction welded to a component comprises holding the workpiece in a recess or hole in a workpiece mounting means with part of the workpiece in the chamber and the part of the workpiece to which the component is to be welded being accessible from the exterior of the chamber.

According to another aspect of the invention we provide a method of holding a component to be welded in friction welding where the component is urged against another component with a weld-pressure generating force and relative friction-generating cyclical motion occurs between the two components to generate welding heat; the method comprising holding the component using frictional forces acting in the generally opposite direction to the weld pressure generating direction.

Thus the frictional gripping force on the component by component holding means is at least as great as the weld-pressure generating force.

The above invention may be expressed as apparatus to hold the workpiece via friction, or to hold the outer peripheral region of the workpiece.

BRIEF DESCRIPTION OF THE DRAWINGS

Embodiments of the invention will now be described by way of example only with reference to the accompanying drawings of which.

DETAILED DESCRIPTION OF PREFERRED EMBODIMENTS

Figure 1:
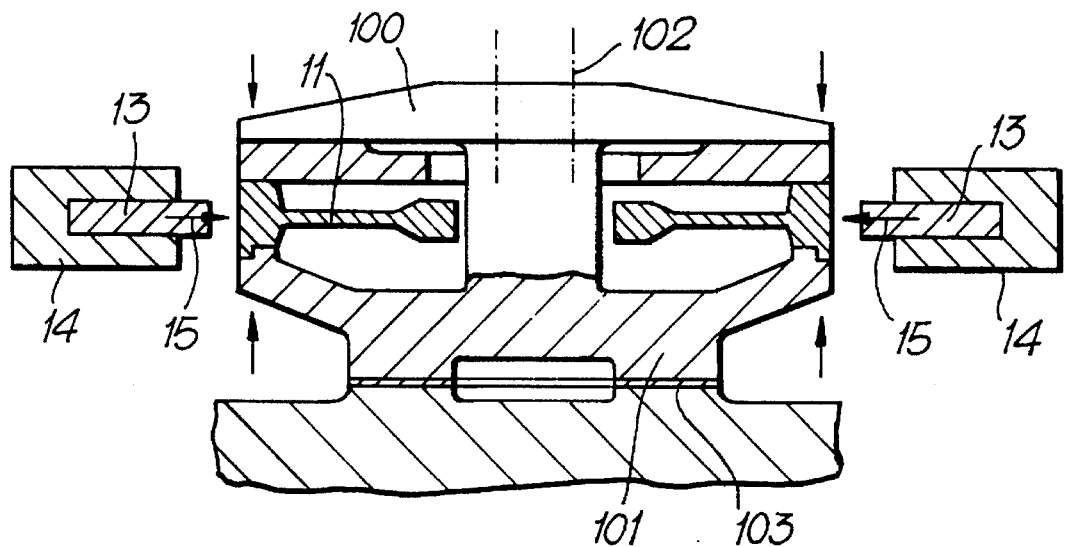
FIG. 1 shows a disc of an axial air-flow compressor of an aircraft engine held in a component holder.

FIG. 1 shows a disc 11 held between upper "oyster shell" clamp member 100 and the lower "oyster shell" clamp member 101. The two clamp members 100 and 101 clamp the disc at its outer annular peripheral regions, on its upper and lower surfaces. The disc is held fixed relative to the two clamp members during friction welding by frictional forces generated by the axial compression forces between the upper and lower clamp member. The frictional forces are substantially the only forces holding the disc during welding. A ring of bolts 102 is provided to provide the axial compression forces to grip the upper and lower surfaces of the disc. A further ring of bolts may be provided towards the outer peripheral edges of the upper and lower clamp members so as to provide an axial clamping force near to, or at, the friction gripping outer peripheral annular regions of the upper and lower clamp members. Of course, the outer ring of bolts does not extend into the disc. In effect the upper and lower clamp members form a cassette which contains the disc or workpiece to which further components are to be friction welded.

In FIG. 1 a blade is shown referenced at 13, a component holder 14 is shown gripping the blade 13, and a weld-generating pressure force is shown by arrow 15. Preferably the weld-generating pressure force is, or at least substantially, in a radial direction. There is relative rubbing movement between the blade and the disc to produce heat so as to friction weld the blade to the disc periphery. The surfaces of the two halves of the oyster tooling shell which contact the disc are smooth preferably so as To leave no marks on its radial surfaces.

The lower clamp holder 101 has a ring of teeth 103 on its lower surface. These teeth co-operate with a complementary ring of teeth on a mounting bed of a friction welding machine so as to allow the entire oyster shell tooling cassette to be indexed around circumferentially by a predetermined amount so as to bring a different region of the periphery of the disc into line with a welding station, i.e., into register with the position at which the component holder 14 can apply a radial welding force.

It will be appreciated that in the arrangement of FIG. 1 the ring of bolts is merely illustrative. It will be apparent to those skilled in the art that there are other ways of exerting a clamping force on the clamping members.

There may be two diametrically opposed, or substantially diametrically opposed, blades welded to the peripheral surface of the disc at once that is simultaneously. This balances the radial welding forces.

A disc to which a multiplicity of blades has been welded is known collectively as a blisk. A blum is two or more such blisks welded together to form an integral, co-axial assembly. It is envisaged that normally the component disc would be welded together to form a drum to which the blades would be attached subsequently. Thus, the component holder, or oyster tooling, may be adapted to clamp either a single disc or a drum assembly.

Figure 2:
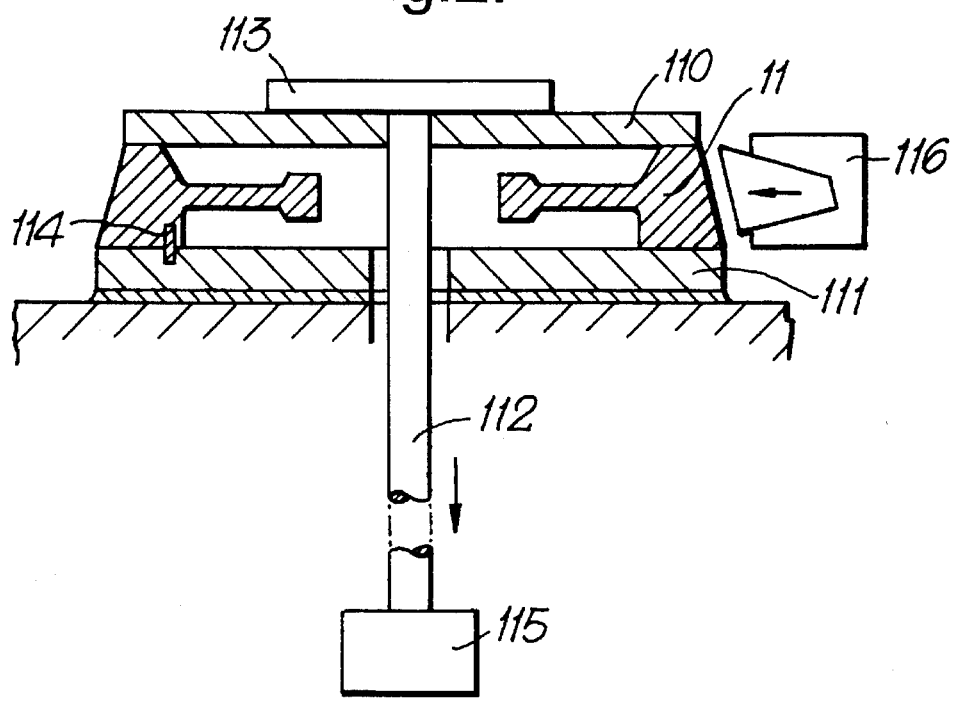
FIG. 2 shows another component holding arrangement.

FIG. 2 shows another disc 11 clamped between upper and lower clamp members 110 and 111. An elongate rigid member in the form of a pull rod 112 extends axially and has a head 113 adapted to urge the upper clamp member 110 axially downwards towards the lower clamp member to grip the disc 11 between the two clamp members. Pull rod 112 extends axially along the axis of the arrangement for gripping the disc and can be moved into operative and inoperative conditions by a clamp force generating mechanism 115 disposed remotely from the region of the disc. When the head 113 is lifted from the plate 110 the disc 11 can be indexed relative to a welding station 116. A pin 114 or more preferably a pair of pins diametrically opposed is used to key the disc to the lower clamp member 111. The lower clamp member 111 can then be indexed between allowable orientations relative to the welding station and carries the blisk with it, possibly leaving the plate 110 in the fixed position, or possibly carrying it with it.

Figure 3:
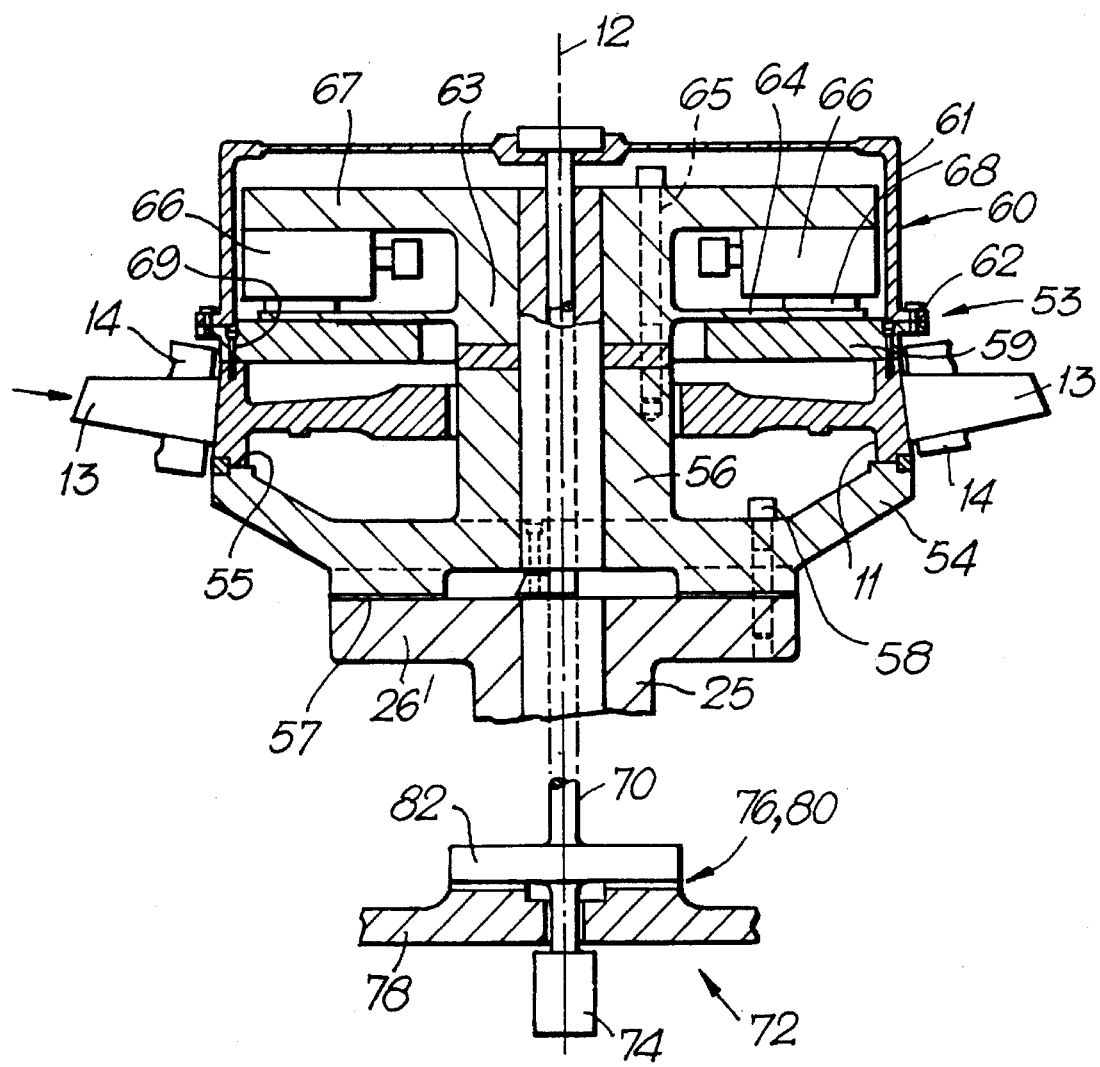
FIG. 3 shows a modified component holder arrangement similar to that of FIG. 1.
Figure 4:
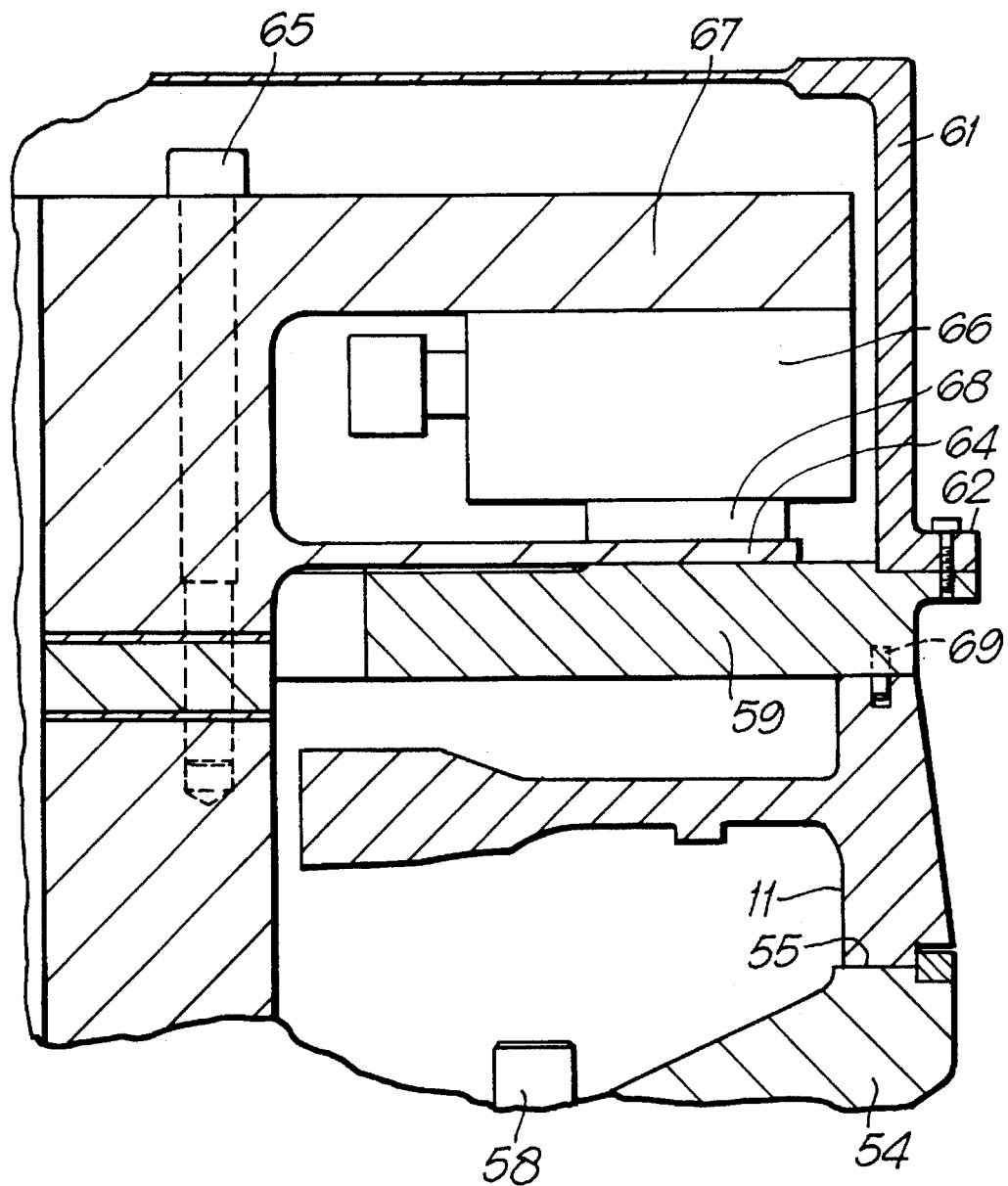
FIG. 4 shows details of the component holder of FIG. 3.

FIGS. 3 and 4 show a disc held in a practical form of component or workpiece holder 52. The disc 11 is clamped axially at its outer annular region by upper and lower clamp members 53 and 54. The blade 13 is clamped by component holder 14 (shown schematically).

The lower clamp member 54 is generally dish-shape, like an oyster shell, with an annular clamping surface 55 and a central annular boss 56. The underside of the base region of the lower clamp member 54 has a ring of teeth 57 which co-operate with a complementary ring of teeth provided on an upper surface of a mounting region 26' the a workpiece mounting member 25. A ring of large bolts 58 firmly clamp the lower clamp member 54 to the mounting region 26'. The teeth 57 transmit reciprocating welding motion to the clamp assembly and the workpiece and assist in preventing any backlash which might otherwise be experienced during relative reciprocating movement between the blade or blades 13 and the disc 11.

The upper clamp member 53 comprises an assembly consisting of an annular pressure plate or ring 59, an operational unit 60 mounted above the ring, and an external bowl-shaped housing 61 having an outwardly directed flange 62.

The operational unit 60 comprises a central boss 63, a reaction member 67, a flexible member 64 extending radially outwards from the boss 63 to overlay the pressure plate 59, and clamping means 66. The two bosses 56 and 63 abut and have complementary rings of teeth provided at their mating faces. They are held together by a ring of large bolts 65. The clamping means 66 is hydraulically operated and reacts against the reaction member 67 and urges an annular piston (or a ring of pistons) 68 against the flexible member 64 so as to force it downwards to press on the pressure plate 59, clamping the annular radially outer peripheral ring region of the disc 11.

The upper annular surface of the disc 11 is keyed to the pressure plate 59 by two keying studs or bolts 69.

The flexible member 64 may consist of an annular disc or diaphragm or a plurality of radially outwardly extending flexible fingers.

In use hydraulic pressure is connected to the clamping means 66 and is increased so as to force the flexible member 64 downwards and thereby cause the pressure plate 59 to clamp the upper and lower external surfaces of the peripheral rim of the disc to hold the rim with friction forces. It is the friction between the clamping surface 55 and the bottom surface of the disc 11 and the friction between the upper surface of the disc 11 and the pressure plate 59 which holds the disc relative to the workpiece holder. The keying by studs 69 plays little or no part. The clamping force is sufficient that the frictional contact around the peripheral edge of the disc is so great that there is no slip between the disc and the workpiece holder 52 during friction welding. Although in FIG. 3 only one blade is shown being welded we prefer to weld diametrically opposed blades simultaneously as this tends to balance out radial forces. However, the apparatus can work with only one blade being welded.

After a weld has been completed the pressure in the hydraulic clamping means 66 is reduced so that the flexible member 64 no longer applies so much or any substantial clamping force to the disc 11. The disc 11 is then indexed around, moving angularly about the axis 12 to another, usually its next, welding position so that another blade can be welded. During the indexing operation the housing 61 and pressure plate 59 are moved to their next angular position and they carry the disc 11 with them by virtue of the keying studs or bolts 69. The hydraulic clamping means 66, the reaction member 67, and the flexible member 64 remain stationary and there is slip between the pressure member 59 and the flexible plate 64, and between The surface 55 of the disc and the lower clamp member 54. It will be noted that the outer shell-like housing 61 is moveable relative to the reaction member 67 and hydraulic clamping means 66.

The indexing drive means and control is mounted remotely from the clamp members 53, 54. The external housing 61 is connected to an elongate shaft 70 which extends co-axially with the center axis 12 through the central bosses 56, 63 of The clamp members to an indexing mechanism generally indicated at 72. The shaft 70 is coupled to an indexing drive motor 74 which may be in the form of a stepping motor. Indexing control is achieved by means of a toothed arrangement. A first, relatively fixed ring of teeth 76 formed on a member 78 which is fixed relative to, or may be part of, workpiece mounting member 25. A second ring of relatively movable teeth 80 are carried by a flange 82 integral with the shaft 70. During a welding operation the two sets of teeth are locked in meshing engagement and the flange 82, shaft 70 and member 78 move in unison with the angular reciprocatory motion of the workpiece mounting member 25. Between welding operations, when it is wished to index disc 11 around to present another part of the disc periphery to the welding station, the index drive 74 is energised to move the flange carried teeth 80 relative to the fixed teeth 76 thereby turning shaft 70 and hence housing 61, through the desired angle of rotation.

In the workpiece holding arrangement shown in FIG. 1 the indexing mechanism is different. The underside of the bottom clamp member again has a ring of teeth, referenced 70, which co-operate with complementary ring of teeth on top of the workpiece locating region of the workpiece mounting member 25. However, in the arrangement of FIG. 1 the indexing is achieved by releasing a gripping force clamping the entire workpiece holder 51 to the ring of teeth on the top of the workpiece mounting region 26', separating the teeth of the workpiece mounting region 26' and the teeth 17, indexing the entire cartridge assembly of the workpiece holder 51 to the next allowable position, and re-clamping the two sets of teeth together so as to make the cartridge workpiece holder 51 immovable angularly relative with the workpiece mounting region 26. It will be appreciated that the spacing of the two sets of teeth assists in determining the index positions since they will tend naturally to make any slight adjustments for a slightly incorrectly aligned workpiece holder 51 so long as the two sets of teeth engage in the correct projection/recess mating combination.

It will be appreciated that the same idea shown in FIG. 2—of an axial pull member—can be used to clamp "the oyster-shell" workpiece holder of FIG. 1, either instead of or in addition to bolts. A central pull rod equivalent to 112 could be provided in the arrangement of FIG. 1 to clamp the workpiece holder to a mounting station for friction welding.

We claim:

1. A workpiece tooling assembly for holding a first component during friction welding, the first component having first and second opposite end faces spaced apart from each other and a peripheral surface to which at least one further component is to be friction welded, the workpiece tooling assembly being driven in an angularly reciprocating movement and comprising:
   a driven workpiece mounting member;
   an axially extending structure mounted to and operatively connected with the driven workpiece mounting member; and
   a workpiece clamping assembly mounted to the axially extending structure, the workpiece clamping assembly having:
      a first clamp member disposed concentrically with and operatively connected to the axially extending structure to engage the first end face of the first component around a first annular region,
      a second clamp member disposed concentrically with and operatively connected to the axially extending structure to engage the second end face of the first component around a second annular region opposite the first annular region, the first and second clamp members being arranged to leave exposed the peripheral surface, and
      clamp force generating means operative to urge the first and second clamp members towards each other in an axial direction to engage and to exert a frictional clamping force of sufficient magnitude on the first component to resist welding and frictional heating forces applied perpendicular to the peripheral surface, wherein the axially extending structure transmits clamping loads from the first and second clamp members to the driven workpiece mounting member.

2. The workpiece tooling assembly as claimed in claim 1 further comprising an annular clamping ring interposed between at least one of the clamp members and the component.

3. The workpiece tooling assembly as claimed in claim 1 wherein the first and second clamp members are rigid and at least one of the clamp members has a dished clamping deck.

4. The workpiece tooling assembly as claimed in claim 1 wherein at least one of the clamp members is shaped to form an internal volume into which the component is received.

5. The workpiece tooling assembly as claimed in claim 1 wherein the clamp force generating means comprises a plurality of clamp force generating actuators.

6. The workpiece tooling assembly as claimed in claim 5 wherein the plurality of clamp force generating actuators are spaced apart around and carried by one of the clamp members.

7. The workpiece tooling assembly as claimed in claim 6 wherein the clamp force generating actuators comprise a plurality of hydraulic actuator rams.

8. The workpiece tooling assembly as claimed in claim 1 wherein at least one of the clamp members together with the component is indexable with respect to a relatively fixed reference position.

9. The workpiece tooling assembly as claimed in claim 8 wherein one of the clamp members remains fixed with respect to the reference position and the other clamp member together with the component is indexable relative thereto.

10. The workpiece tooling assembly as claimed in claim 1 wherein the axially extending structure includes an elongate rigid member.

11. Friction welding apparatus including a component holder for holding a first component during friction welding, the first component having first and second opposite end faces spaced apart from each other and a peripheral surface to which at least one further component is to be friction welded, the friction welding apparatus being driven in an angularly reciprocating movement and comprising:

a driven workpiece mounting member;

an axially extending structure mounted to and operatively connected with the driven workpiece mounting member; and a workpiece clamping assembly mounted to the axially extending structure, the workpiece clamping assembly having:

a first clamp member disposed concentrically with and operatively connected to the axially extending structure to engage the first end face of the first component around a first annular region, a second clamp member disposed concentrically with and operatively connected to the axially extending structure to engage the second end face of the first component around a second annular region opposite the first annular region, said first and second clamp members being arranged to leave exposed the peripheral surface, and clamp force generating means operative to urge the first and second clamp members towards each other in an axial direction to engage and to exert a frictional clamping force of sufficient magnitude on the first component to resist welding and frictional heating forces applied perpendicular to said peripheral surface.

* * * * *